Patented Sept. 7, 1948

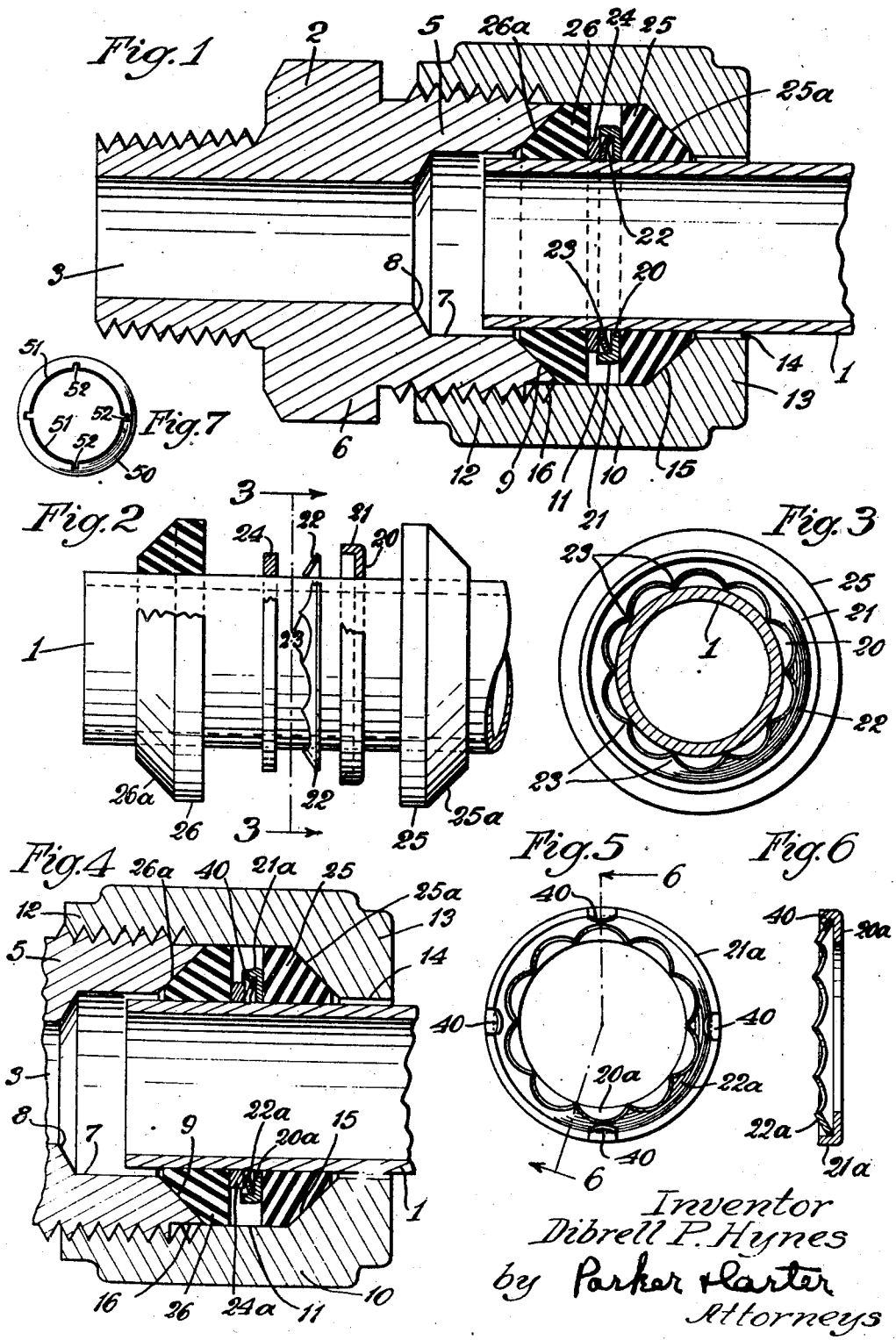

2,448,888

UNITED STATES PATENT OFFICE 2,448,888

FITTING

Dibrell P. Hynes, Evanston, Ill., assignor to Chicago Forging and Manufacturing Company, Chicago, Ill., a corporation of Delaware Application April 5, 1946, Serial No. 659,825

5 Claims. (Cl. 285—90)

My invention relates to an improvement in joints or securing means for tubes. One purpose is to provide such securing means which can be quickly and easily applied, without the need of special tools.

Another purpose is to provide a joint which will stand high pressures.

Another purpose is to provide a joint anchorage means which will be solidly fixed or secured to the exterior surface of the tube.

Other purposes will appear from time to time in the course of the specification and claims.

I illustrate the invention more or less diagrammatically in the accompanying drawings wherein:

Figure 1 is a longitudinal section through the axis of the tube;

Figure 2 is a side elevation illustrating parts of the joint on the tube, with parts broken away and parts in radial section;

Figure 3 is a section on the line 3—3 of Figure 2;

Figure 4 is a section similar to Figure 1 of a variant form of the device;

Figure 5 is a plan view of the washer and retainer of the form of Figure 4;

Figure 6 is a section on the line 6—6 of Figure 5; and

Figure 7 illustrates a variant form of locking ring.

Referring to the drawings and first to Figures 1 to 3, 1 indicates a tube end. 2 generally indicates a member to which the tube end is secured.

There is shown as a fitting having a center bore 3, an outwardly screw-threaded tube receiving portion 5. 6 is any suitable enlargement which may be hexagonal or octagonal in order to receive any suitable tightening tool. The portion 5 is provided with an enlarged bore 7 connected to the bore 3 by a tapered surface portion 8. It will be noted that the bore 7 is of sufficient diameter to receive the inner end of the tube 1 without a metal to metal contact. Portion 5 is shown as terminating in an inwardly conic end surface 9. 10 generally indicates a pressure member or nut having an internal generally cylindrical surface 11 and an inwardly threaded portion 12, formed to be threaded upon the exterior threads of the portion 5. The nut 10 has an end portion 13 formed with an aperture or bore 14 through which the tube 1 passes. The bore 14 is of sufficient diameter normally to prevent metal to metal contact between the tube 1 and the nut 10. The portion 13 has an inner conic surface 15 opposed to and conforming generally to the conic surface 9. It will be noted also that the portion 5 has an outwardly cylindrical surface 16 adapted slidingly to receive the cylindrical surface 11 of the nut 10 with the parts positioned as shown in Figure 1.

As a joint anchorage I employ a retainer ring 20 shown as having a circumferential flange 21. Fitting into the cup space thus formed is an initially conic grip ring or abutment member 22 shown as having a plurality of teeth 23. Its outer diameter is such that it can penetrate within it having its outer edge surrounded by the cup or retainer flange 21. 24 is a thrust ring which snugly surrounds the tube 1. The three rings thus described may be positioned at any desired point along the tube 1. At the point where the operator wishes to set the anchorage, he inserts the ring 22 within the flange 21 and abuts the thrust ring 24 against the ring 22. He applies an annular compressible elastic washer at each side of the abutment, in the position in which the parts are shown in Figure 1. The two abutments 25, 26, may be identical but reversed. If desired, they may be preformed to have conic surfaces 25a and 26a adapted to conform to the conic inner surfaces 9 and 15 of the pressure chamber which is formed by the member 6, and the nut 10 of the tube 1. Relative rotation of the nut 10 and the member 6 is adapted to compress the washers 25 and 26. In the position of the parts in Figure 1 this compression is indicated as having begun. It will be understood that relative rotation of the members 6 and 10 may be continued until the thrust ring 24 and the flange 21 have forced the teeth 23 of the abutment or locking ring 22 into the face or outer surface of the tube 1. This penetration is shown as begun in Figure 1. It will be understood that when the compression is completed, the washers or compressible members 25 and 26 bridge the gap between the tube 1 and the cylindrical inner wall 11, and extend between the end walls 9 and 15 respectively, and the above described anchorage. The ring 26 serves as a seal, and the ring 25 as a cushion.

Referring to the form of Figures 4, 5 and 6, the structure is identical, except that the retaining cup 20a has a circumferential flange 21a provided with securing ears 40 which hold the abutment or corresponding ring 22a in the position shown. The thrust ring 24a is opposed to the grip ring 22a, at the point at which the user wishes the anchorage to position. The joint is then completed as above described in connection with the form of Figures 1, 2 and 3, and the remaining elements of Figure 4 are given the same numbers as the corresponding elements of Figure 1.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

The use and operation of the invention are as follows:

The abutment or anchorage is set at the desired point along the tube 1. The washers 25 and 26 are then put into position against opposite sides of the rings 20 and 24. The nut 10 is then moved against the washer 25, and about the exterior of the two washers. The member 6 and the nut 10 are then screw threaded together, until the joint or connection has been subjected to the desired compression. No tool or forming device is necessary. The rings 20 and 24 are initially freely slidable along the tube 1, and the user can thus easily set the joint or connection at the desired point in relation to the end of the tube 1. The joint will resist pressures of the order of 8,000 lbs. or more per square inch. The washers 25 and 26 space the tube 1 inwardly, and prevent any metal to metal contact. Preferably the material of which the washers 25 and 26 are formed is relatively stiff or resistant, for example, it is desirable that the material of the washers be not extruded any substantial distance outwardly along the face of the tube 1.

It will be noted that the locking ring or grip ring may be made in various forms. In Figs. 3 and 5 the grip ring members 22 and 22a are illustrated as having relatively sharp teeth 23. In the form of Fig. 7 the grip ring 50 is more or less conic or tapered, but is split or separated into a series of segments 51 by separating gaps 52. Thus, instead of a series of sharp teeth, I employ a plurality of arcuate edged gripping segments. It will be understood that the ring of Fig. 7 may be substituted for the ring of Figs. 3 or 5, the structures being otherwise unchanged.

I claim:

1. In a pressure joint, a tube, a pressure housing for receiving and surrounding said tube, said housing including a plurality of relatively movable chamber elements, one of said elements having an aperture through which the end of the tube extends, an anchorage on said tube including a deformable gripping ring and a circumferentially flanged member surrounding and confining the outer edge of said gripping ring, and means for providing a seal between said tube and said housing including bodies of flexible sealing material surrounding said tube and opposed to opposite sides of said anchorage, said relatively movable elements being adapted to subject said sealing bodies to sufficient compression to deform said gripping ring into tube gripping position.

2. In a pressure joint, a tube, a pressure housing for receiving and surrounding said tube, said housing including a plurality of relatively movable chamber elements, one of said elements having an aperture through which the end of the tube extends, an anchorage on said tube including a deformable gripping ring, a circumferentially flanged member surrounding and confining the outer edge of said gripping ring, and a thrust ring, and means for providing a seal between said tube and said housing including bodies of flexible sealing material surrounding said tube and opposed to opposite sides of said anchorage, said relatively movable elements being adapted to subject said sealing bodies to sufficient compression to urge said thrust ring along said tube with sufficient force to deform said gripping ring into tube gripping position.

3. In a joint, a tube, an annular anchor on said tube, including a ring having a web and a cylindrical flange on an outer portion of said web, a deformable, initially generally conic ring having an outer edge adapted to seat within said flange, the radius of said ring being less than the inside radius of said flange, and means for anchoring said structure in place and for at the same time forming a tight joint, including masses of flexible elastic sealing material located on opposite sides of said anchor and a pressure housing to which said tube is connected, said housing including a plurality of relatively movable chamber elements, one of said elements having an aperture through which the end of the tube extends, and means for moving said chamber elements together against said masses of sealing material, thereby to place said masses under pressure, said masses, when the elements are fully assembled, being effective to urge said conic ring against said flange ring, whereby the inner edge of said conic ring is forced into the outer surface of said tube.

4. In a pressure joint, a tube, an anchorage on said tube, a pressure housing for receiving and surrounding said aube, said housing including a plurality of chamber elements, one of said elements having an aperture through which an end of the tube extends, flexible sealing means surrounding said tube and positioned within said housing, and means for locking said anchorage on said tube including means for imparting relative movement to said chamber elements, and for thereby placing said sealing means under pressure, said anchorage including a circumferentially extending abutment ring and a tapered pressure ring adapted to be positioned within said abutment ring.

5. In a pressure joint, a tube, a pressure housing for receiving and surrounding said pressure tube, said housing including a plurality of relatively movable chamber elements, one of said elements having an aperture through which the end of the tube extends, an anchorage on said tube including a deformable gripping ring and a circumferentially flanged member surrounding and confining the outer edge of said gripping ring, and means for providing a seal between said tube and said pressure housing including bodies of flexible sealing material surrounding said tube and opposed to opposite sides of said anchorage, said relatively movable elements being adapted to subject said sealing bodies to sufficient compression to deform said gripping ring into tube gripping position, said deformable gripping ring having circumferentially spaced gripping elements adapted to engage and grip the outer surface of said tube.

DIBRELL P. HYNES.

REFERENCES CITED

The following references are of record in the file of this patent:

UNITED STATES PATENTS

| Number | Name | Date |
| --- | --- | --- |
| 1,440,207 | Burns | Dec. 26, 1922 |
| 1,957,605 | Lamont, B. N. R. | May 8, 1934 |
| 2,349,180 | Lamont, J. H. | May 16, 1944 |
| 2,394,351 | Wurzburger | Feb. 5, 1946 |
| 2,425,662 | Wolfram | Aug. 12, 1947 |

FOREIGN PATENTS

| Number | Country | Date |
| --- | --- | --- |
| 134,690 | Great Britain | Nov. 13, 1919 |